US009898761B2

(12) United States Patent
Roth

(10) Patent No.: US 9,898,761 B2
(45) Date of Patent: Feb. 20, 2018

(54) METHOD OF COMPENSATING A PROVIDER FOR ADVERTISEMENTS DISPLAYED ON A MOBILE PHONE

(71) Applicant: Nuance Communications, Inc., Burlington, MA (US)

(72) Inventor: Daniel L. Roth, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/854,450

(22) Filed: Sep. 15, 2015

(65) Prior Publication Data

US 2016/0005076 A1 Jan. 7, 2016

Related U.S. Application Data

(63) Continuation of application No. 11/207,594, filed on Aug. 19, 2005, now Pat. No. 9,152,982.

(51) Int. Cl.
*H04M 11/00* (2006.01)
*G06Q 30/02* (2012.01)
(Continued)

(52) U.S. Cl.
CPC ......... *G06Q 30/0273* (2013.01); *G06Q 30/02* (2013.01); *G06Q 30/0257* (2013.01);
(Continued)

(58) Field of Classification Search
CPC ............... G06Q 30/0273; G06Q 30/02; G06Q 30/0267; G06Q 30/0257; H04L 12/14;
(Continued)

(56) References Cited

U.S. PATENT DOCUMENTS 5,933,811 A 8/1999 Angles et al.
6,031,467 A 2/2000 Hymel et al.
(Continued)

FOREIGN PATENT DOCUMENTS

EP 0 854 417 A2 7/1998
EP 1 073 292 A2 1/2001
(Continued)

OTHER PUBLICATIONS

U.S. Appl. No. 14/854,377, filed Sep. 15, 2015, Roth.
(Continued)

*Primary Examiner* — Khai M Nguyen
(74) *Attorney, Agent, or Firm* — Wolf, Greenfield & Sacks, P.C.

(57) ABSTRACT

A method and apparatus for advertising on a mobile phone. In one embodiment the method includes the steps of downloading an advertisement to the mobile phone using an advertisement server; selecting the downloaded advertisement on the mobile phone by a user of the mobile phone; providing by a server additional information in response to the user selection; and tracking the selection and additional information by the server. In another embodiment the compensation provided is in response to the display screen of said advertisement. In another embodiment the step of providing additional information includes the step of using space reserved, in the user interface of the mobile phone, for advertisements. Another aspect the invention relates to a system for displaying advertisements on a mobile phone. In one embodiment the system includes a server; and a mobile phone in communication with said server.

19 Claims, 3 Drawing Sheets

(51) Int. Cl.
*H04L 12/14* (2006.01)
*H04L 29/08* (2006.01)
*H04M 15/00* (2006.01)

(52) U.S. Cl.
CPC ......... *G06Q 30/0267* (2013.01); *H04L 12/14* (2013.01); *H04L 67/04* (2013.01); *H04L 67/20* (2013.01); *H04M 15/8033* (2013.01); *H04M 15/8088* (2013.01)

(58) Field of Classification Search
CPC .... H04L 67/20; H04L 67/04; H04M 15/8033; H04M 15/8088
USPC ................................. 455/406, 407, 408, 419
See application file for complete search history.

(56) References Cited

U.S. PATENT DOCUMENTS

| | | | |
|---|---|---|---|
| 6,084,583 | A | 7/2000 | Gerszberg et al. |
| 6,128,651 | A | 10/2000 | Cezar |
| 6,141,010 | A | 10/2000 | Hoyle |
| 6,157,841 | A | 12/2000 | Bolduc et al. |
| 6,285,364 | B1 | 9/2001 | Giordano, III et al. |
| 6,298,218 | B1 | 10/2001 | Lowe et al. |
| 6,332,127 | B1 | 12/2001 | Bandera et al. |
| 6,381,465 | B1 | 4/2002 | Chern et al. |
| 6,397,057 | B1 | 5/2002 | Malackowski et al. |
| 6,401,085 | B1 | 6/2002 | Gershman et al. |
| 6,452,498 | B2 | 9/2002 | Stewart |
| 6,484,148 | B1 | 11/2002 | Boyd |
| 6,560,456 | B1 | 5/2003 | Lohtia et al. |
| 6,608,556 | B2 | 8/2003 | De Moerloose et al. |
| 6,647,269 | B2 | 11/2003 | Hendrey et al. |
| 6,727,930 | B2 | 4/2004 | Currans et al. |
| 6,753,884 | B1 | 6/2004 | Finch, II et al. |
| 6,769,010 | B1 | 7/2004 | Knapp et al. |
| 6,826,614 | B1 | 11/2004 | Hanmann et al. |
| 6,842,767 | B1 | 1/2005 | Partovi et al. |
| 6,862,445 | B1 | 3/2005 | Cohen |
| 6,885,736 | B2 | 4/2005 | Uppaluru |
| 7,058,593 | B1 | 6/2006 | Merritt |
| 8,682,299 | B2 | 3/2014 | Jung et al. |
| 9,152,982 | B2 | 10/2015 | Roth |
| 9,152,983 | B2 | 10/2015 | Roth |
| 2001/0051517 | A1 | 12/2001 | Strietzel |
| 2002/0010630 | A1 | 1/2002 | Kitamura |
| 2002/0072848 | A1* | 6/2002 | Hamada ................ G01C 21/32 701/431 |
| 2002/0090934 | A1* | 7/2002 | Mitchelmore .......... H04L 29/06 455/412.2 |
| 2002/0120589 | A1 | 8/2002 | Aoki |
| 2002/0128907 | A1 | 9/2002 | Sato et al. |
| 2002/0129101 | A1* | 9/2002 | Tamaki ................ G06Q 30/02 709/203 |
| 2002/0165773 | A1 | 11/2002 | Natsuno et al. |
| 2002/0184097 | A1* | 12/2002 | Hijiri .................... G06Q 30/02 705/14.64 |
| 2003/0125958 | A1 | 7/2003 | Alpdemir et al. |
| 2003/0149938 | A1 | 8/2003 | McElfresh et al. |
| 2004/0006478 | A1 | 1/2004 | Alpdemir et al. |
| 2004/0076279 | A1 | 4/2004 | Taschereau |
| 2004/0103024 | A1 | 5/2004 | Patel et al. |
| 2004/0140989 | A1 | 7/2004 | Papageorge |
| 2004/0224662 | A1 | 11/2004 | O'Neil et al. |
| 2005/0004627 | A1 | 1/2005 | Gibson et al. |
| 2005/0004840 | A1 | 1/2005 | Wanninger |
| 2005/0005242 | A1 | 1/2005 | Hoyle |
| 2005/0021744 | A1 | 1/2005 | Haitsuka et al. |
| 2005/0027594 | A1 | 2/2005 | Yasnovsky et al. |
| 2005/0054381 | A1 | 3/2005 | Lee et al. |
| 2005/0160014 | A1 | 7/2005 | Moss et al. |
| 2005/0251445 | A1* | 11/2005 | Wong .................. G06Q 30/02 705/14.69 |
| 2006/0004627 | A1 | 1/2006 | Baluja |
| 2007/0042760 | A1 | 2/2007 | Roth |
| 2010/0257553 | A1 | 10/2010 | Yuen et al. |
| 2014/0108150 | A1 | 4/2014 | Roth |
| 2016/0005086 | A1 | 1/2016 | Roth |

FOREIGN PATENT DOCUMENTS

| | | |
|---|---|---|
| EP | 1 143 679 A2 | 10/2001 |
| JP | 11-88521 | 3/1999 |
| JP | 2000-228704 A | 8/2000 |
| JP | 2001-186575 A | 7/2001 |
| JP | 2001-357291 A | 12/2001 |
| JP | 2002-063479 A | 2/2002 |
| JP | 2002-092481 A | 3/2002 |
| JP | 2002-099837 A | 4/2002 |
| JP | 2002-304142 A | 10/2002 |
| JP | 2002-539481 A | 11/2002 |
| JP | 2002-540477 A | 11/2002 |
| JP | 2002-540479 A | 11/2002 |
| JP | 2003-050767 A | 2/2003 |
| JP | 2003-228675 A | 8/2003 |
| JP | 2004-286872 A | 10/2004 |
| JP | 2005-032272 A | 2/2005 |
| WO | WO 00/54252 A2 | 9/2000 |
| WO | WO 00/58942 A2 | 10/2000 |
| WO | WO 00/58946 A1 | 10/2000 |
| WO | WO 00/77978 A2 | 12/2000 |
| WO | WO 01/91488 A1 | 11/2001 |
| WO | WO 02/31814 A1 | 4/2002 |
| WO | WO 02/35377 A2 | 5/2002 |
| WO | WO 02/41169 A1 | 5/2002 |
| WO | WO 04/054217 A2 | 6/2004 |
| WO | WO 05/020094 A2 | 3/2005 |

OTHER PUBLICATIONS

CN 200680034011.5, Feb. 11, 2011, Office Action.
CN 200680034011.5, Mar. 5, 2012, Office Action.
EP 06789284.4, Nov. 26, 2008, Office Action.
EP 10192638.4, Feb. 21, 2011, European Search Report.
EP 06789284.4, Feb. 24, 2011, Office Action.
EP 10192638.4, Nov. 14, 2012, Office Action.
EP 06789284.4, Dec. 18, 2012, Notice of Allowance.
EP 10192638.4, Nov. 12, 2013, Summons to Oral Proceedings.
EP 10192639.2, Feb. 17, 2011, European Search Report.
EP 10192639.2, Nov. 14, 2012, Office Action.
JP 2008-526969, Jul. 14, 2011, Office Action.
JP 2008-526969, Jun. 5, 2012, Office Action.
JP 2012-006296, Apr. 12, 2013, Office Action.
JP 2012-006296, Feb. 10, 2014, Office Action.
PCT/US2006/030229, Feb. 23, 2007, International Search Report and Written Opinion.
PCT/US2006/030229, Feb. 20, 2008, International Preliminary Report on Patentability.
International Preliminary Report on Patentability and the Written Opinion of the International Searching Authority for International Application No. PCT/US2006/030229 dated Feb. 20, 2008.
International Search Report and Written Opinion for International Application No. PCT/US2006/030229 dated Feb. 23, 2007.
Notice of Allowance for European Application No. 06789284.4 dated Dec. 18, 2012.
Office Action for Chinese Application No. 200680034011.5 dated Feb. 11, 2011.
Office Action for Chinese Application No. 200680034011.5 dated Mar. 5, 2012.
Office Action for European Application No. 06789284.4 dated Feb. 24, 2011.
Office Action for European Application No. 06789284.4 dated Nov. 26, 2008.
Office Action for European Application No. 10192638.4 dated Nov. 14, 2012.
Office Action for European Application No. 10192639.2 dated Nov. 14, 2012.
Office Action for Japanese Application No. 2008-526969 dated Jun. 5, 2012.

(56) References Cited

OTHER PUBLICATIONS

Office Action for Japanese Application No. 2012-006296 dated Apr. 12, 2013.
Office Action for Japanese Application No. 2012-006296 dated Feb. 10, 2014.
Office Action for Japanese Patent Application No. 2008-526969 dated Jul. 14, 2011.
Summons to Oral Proceedings for European Application No. 10192638.4 dated Nov. 12, 2013.
European Search Report for Application No. EP 10 19 2638 dated Feb. 21, 2011.
European Search Report for Application No. EP 10 19 2639 dated Feb. 17, 2011.
Dalianis et al., "SiteSeeker Voice—A speech controlled search engine," Feb. 25, 2003), http://www.nada.kth.se/hercules/wapalizer/SiteSeekerVoice.html>retrieved on Oct. 30, 2006.
Google Short Message Service (SMS), [online] [retrieved on Sep. 29, 2005]. Retrieved from the Internet <URL:http://www.google.com/sms/>.
Hemphill et al. "Surfing the Web by Voice," Proceedings ACM Multimedia, Nov. 1995-11, pp. 215-222 (Nov. 1995).
Nokia 616 Car Kit, [online] [retrieved on Sep. 29, 2005]. Retrieved from the Internet <URL:http://europe.nokia.com/nokia/0,,65324,00.html>.
White, M., "Multimodal interaction and the mobile Web, Part 2: Simple searches with Find-It", (Feb. 6, 2005), http://www-128.ibm.com/developerworks/web/library/wi-mobweb2/> retrieved on Oct. 31, 2006.

\* cited by examiner

METHOD OF COMPENSATING A PROVIDER FOR ADVERTISEMENTS DISPLAYED ON A MOBILE PHONE

RELATED APPLICATIONS

This application claims the benefit under 35 U.S.C. §120 and is a continuation of U.S. application Ser. No. 11/207,594, entitled "METHOD OF COMPENSATING A PROVIDER FOR ADVERTISEMENTS DISPLAYED ON A MOBILE PHONE," filed on Aug. 19, 2005, each application of which is herein incorporated by reference in its entirety.

FIELD OF THE INVENTION

The invention relates generally to the field of advertising and more specifically to the field of compensating the distributor of advertisements.

BACKGROUND OF THE INVENTION

Advertising is ubiquitous. As a result, advertisements lose their effectiveness as the potential purchaser is saturated with unwanted ads. Advertisers, to compensate for this decline in effectiveness, search for additional venues in to place advertisements. Such recently used new venues for advertisement placement include: preludes to movies in movie theaters, advertisements embedded in DVDs; and as pop-up ads on computers.

One area that is relatively untapped for advertisement placement is the display screen of mobile phones. Because there are billions of mobile phones in use in the world, each having a visual and audible display, mobile or cellular phones are a significant venue for providing such advertisements to a large audience. Because the screen in each of these cell phones is typically idle, and because a cell phone user must look at the screen each time he or she uses the phone, the cell phone display is a potentially the most valuable venue for placing an advertisement.

A problem with advertising is that it is not directed to the individual. Advertisers typically must perform surveys or look at product sales during an advertising campaign to determine how effective the advertising campaign is with respect to the target audience. Even using these metrics the advertiser typically pays the same for the distribution of a productive advertisement in a campaign as for a non-productive advertisement in a campaign.

What is needed is a method for linking the costs of placing the advertisement with the value of the advertisement. The present invention addresses this issue.

SUMMARY OF THE INVENTION

The invention relates to a method and apparatus for advertising on a mobile phone. In one embodiment the method includes the steps of downloading an advertisement to the mobile phone using an advertisement server; selecting the downloaded advertisement on the mobile phone by a user of the mobile phone; providing, by a server, additional information in response to the user selection; and tracking the selection and additional information by the server. In another embodiment the step of providing additional information includes the step of connecting the mobile phone to a second server in response to the user selection. In yet another embodiment the method further includes the step of providing incentives to the user for permitting an advertisement to be downloaded to the mobile phone. In still yet another embodiment the incentive is a reduction in mobile phone fees.

In another embodiment the step of selecting is performed by voice recognition. In yet another embodiment the voice recognition is performed using imbedded tags in said advertisement. In still yet another embodiment the method also includes providing compensation to the mobile phone service provider by an advertiser. In another embodiment the compensation provided is in response to the display screen of said advertisement. In yet another embodiment the method further includes the step of exchanging information between said server and said mobile phone. In still yet another embodiment the information includes the capabilities of the mobile phone. In another embodiment the step of providing additional information includes the step of using space reserved, in the user interface of the mobile phone, for advertisements.

In another aspect the invention relates to a system for displaying advertisements on a mobile phone. In one embodiment the system includes a server; and a mobile phone in communication with said server. In one embodiment mobile phone includes a user interface and a user input device. The server downloads an advertisement to the mobile phone for display by the user interface. In one embodiment the server tracks advertising usage by the user in response to the advertisement being downloaded.

In another embodiment the system further includes a communication connection to a second server in response to the downloaded advertisement. In yet another embodiment the system includes a billing system providing compensation to the user for allowing the advertisement to be downloaded to the mobile phone. In one embodiment the user input device includes a voice recognition system. In another embodiment the system further includes a compensation system in communication with the server to provide compensation to a mobile phone service provider by an advertiser in response to the advertisement being downloaded. In yet another embodiment the user interface includes a screen space reserved for advertising.

Yet another aspect of the invention is a system for advertising on a mobile phone. In one embodiment the system includes means for downloading an advertisement to the mobile phone of a user; means for allowing a user to select the advertisement being downloaded; means for providing additional information to the user in response to the selection by the user; and means for tracking advertisement selection. In one embodiment the system further includes means for connecting to a second server in response to said selected advertisement. In another embodiment the system includes means for providing incentives to a user for allowing an advertisement to be downloaded. In yet another embodiment the means for allowing a user to select includes means for voice recognition.

In one embodiment the system further includes providing means for providing compensation to a mobile cell phone service provider in response to a user selecting an advertisement. In another embodiment the system further includes means for exchanging information prior to downloading the advertisement to the mobile phone. In another embodiment the invention relates to a method for advertising on a mobile phone by reserving space at a location on a mobile phone display for the purpose of displaying advertisements, downloading, to the reserved space on the mobile phone, an advertisement from an advertiser using an advertisement server, and billing the advertiser in response to the location of the reserved space.

DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION OF THE PREFERRED EMBODIMENT

Figure 1:
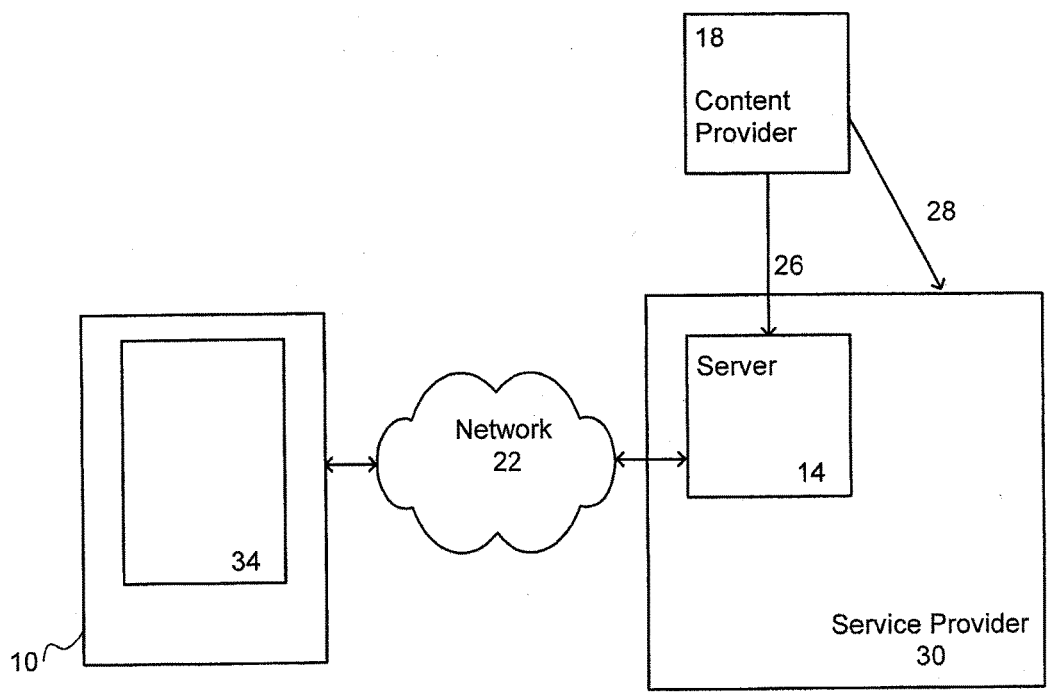
FIG. 1 is a block diagram of an embodiment of the system of the invention.

Referring to FIG. 1, and in brief overview, an embodiment of a system constructed in accordance with the invention includes a mobile communication device such as a cell phone 10, an advertisement server 14; an advertisement provider 18 and a network 22. The cell phone 10 is configured to receive advertisements from an advertisement server 14. The advertisement server 14 typically is part of the network of a mobile communications device provider 30. The advertisements 26 are provided to the advertisement server 14 by an advertiser content provider 18 who remunerates 28 the mobile communications device provider 30 according predetermined criteria based on the display of the advertisement on the screen 34 of the mobile communications device 10.

Software built into the cell phone is capable of rendering graphics of the advertisement which are downloaded to the display. Further, the user can select the advertisement in order to obtain further information about the product.

Figure 2:
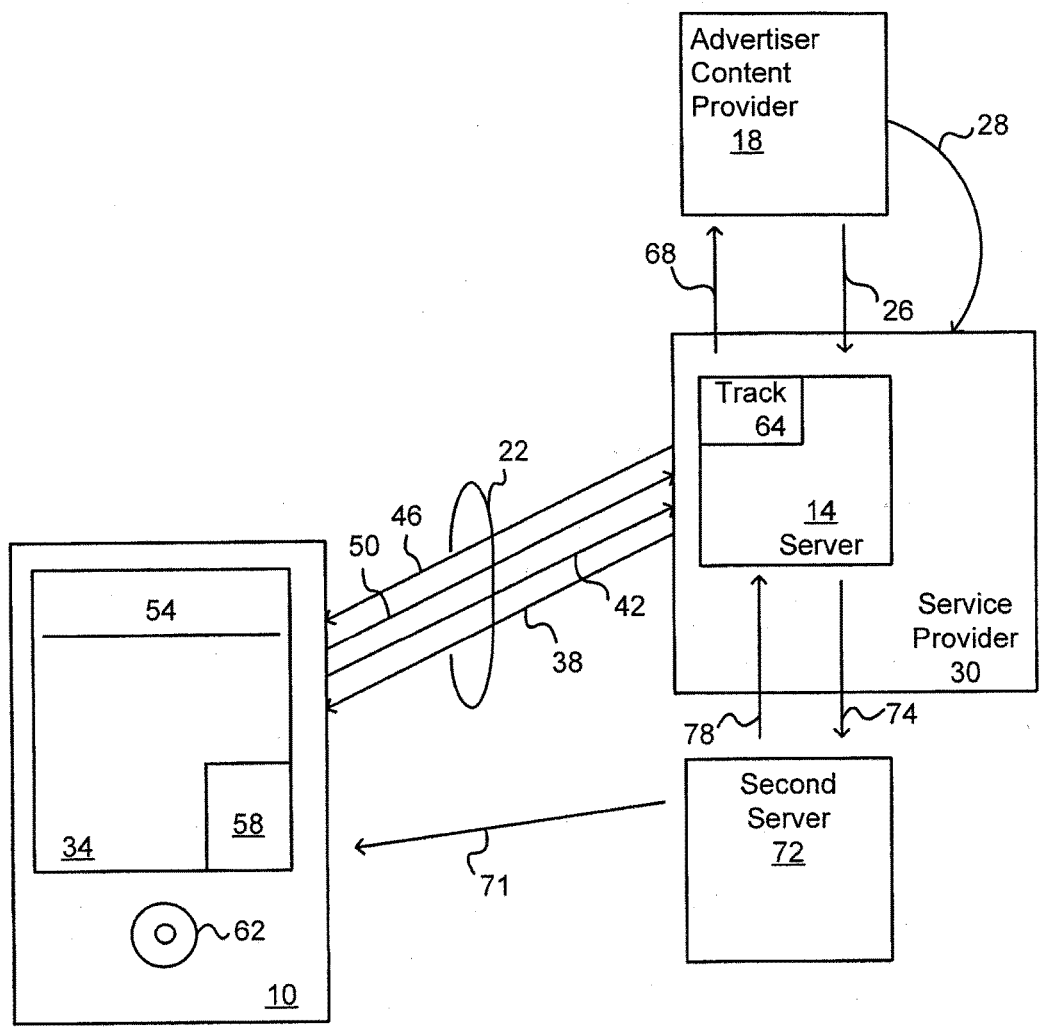
FIG. 2 is a more detailed diagram of the embodiment of the invention in FIG. 1.

In more detail and referring to FIG. 2, a mobile communications device such as a cell phone 10 is configured to receive advertisements from a server 14 typically provided by a mobile communications device service provider 30. In one embodiment the user of the mobile communications device 10 is given an incentive to permit advertisements to be downloaded from the server 14 to the mobile communications device 10. These incentives may range from coupons or credits that are redeemable by the user for the merchandize advertised to a decrease in the monthly cost of the mobile communications service to the user. These incentives may be provided by the mobile communications service provider 30 or the advertiser content provider 18 directly.

Initially the server 14 interrogates 38 the mobile communications device 10 to determine its display capabilities. The mobile communications device 10 responds with information 42 indicating its display parameters such as screen size. At this point the server 14 downloads the advertisement 46 in a form suitable for display on screen 34. The user then responds to the advertisement by transmitting a request 50 for additional screens of information (generally 46), if the user so desires.

In one embodiment the location of the advertisement 46 in the display screen 34 determines the charge to the advertiser 18. For example a banner location 54 may be selected to have a higher value than a corner location 58. This is similar to the mechanism by which merchandise producers pay merchants various amounts according to the location of the producer's product on shelf space in the store. Products placed on shelves at eye level result in higher payments to the merchants than do products placed on lower or higher shelves. These reserved locations 54, 58 on the screen 34 provide one criteria for paying the service provider 30 for the download of advertisements to the mobile communications device 10.

A second criterion for providing payment to the service provider 30 is provided by the interest the user has in the advertisement. That is, if the user receives an advertisement in which he or she is interest, the user can use the input device or keypad 62 of the mobile communication device 10 to send a request 50 to the server 14 for additional screens of information. In one embodiment, a screen tracking module 64 keeps track of how many screens the user requests and sends a notification to the advertiser content provider 18. This notification acts as an invoice indicating which advertisements were viewed by the user and the cost to the advertiser 18 for each of the downloaded advertisement screens.

In another embodiment, a second server 72 is utilized when the user sends a request 50 for additional information in response to the advertisement. In one such embodiment the server 14 passes off control 74 of the down load of information 76 directly to the secondary server 72. In another embodiment the secondary server 72 passes the requested advertising information 78 to the server 14 which then downloads the information 46 to the mobile communication device 10. In some embodiments the second server belongs to the manufacturer of the product or service advertised or belongs to the advertiser content provider 18.

Figure 3:
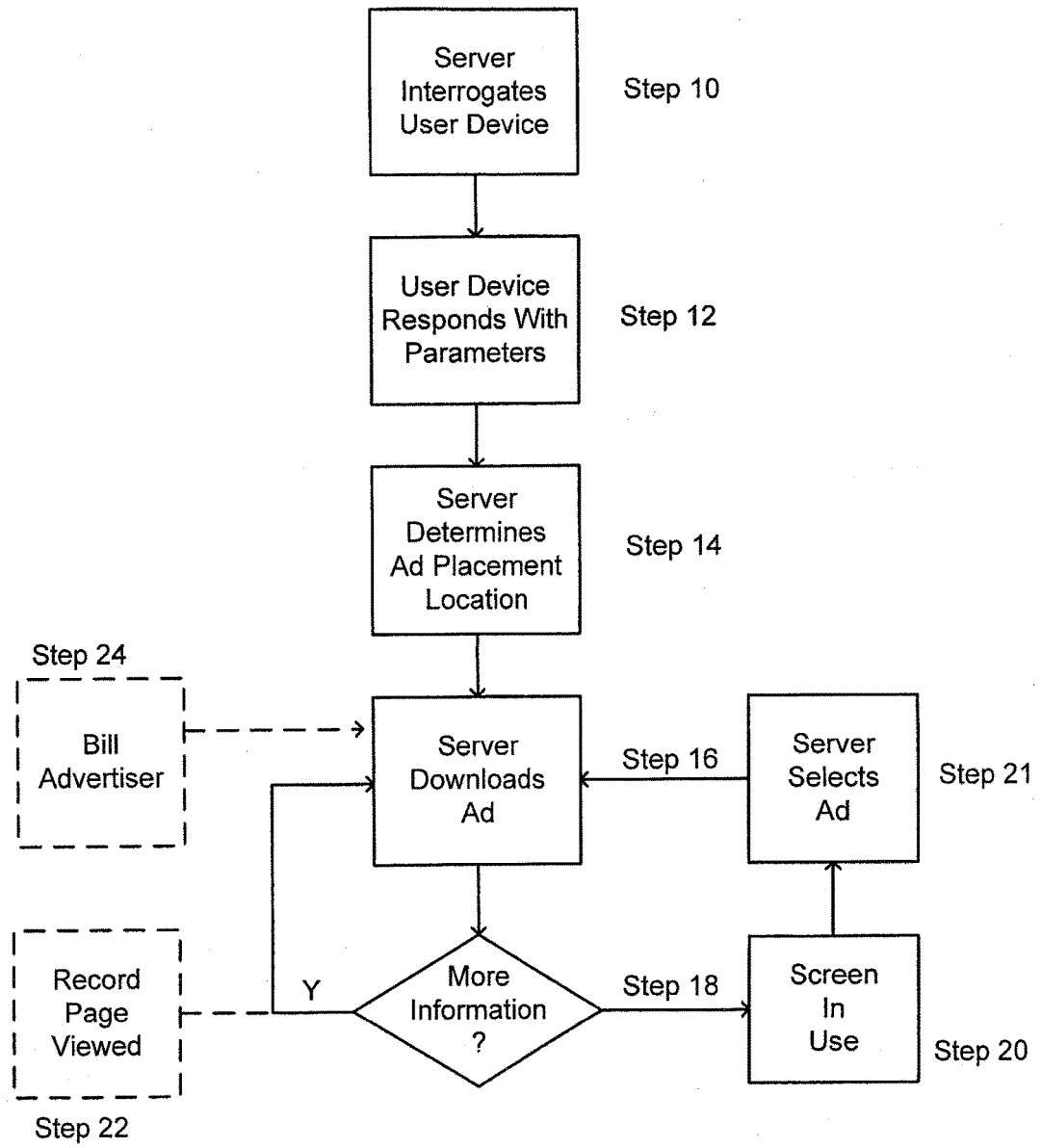
FIG. 3 is a flow diagram utilized by the embodiments of the invention shown in FIGS. 1 and 2.

Referring also to FIG. 3, the operation of an embodiment of the invention is shown. Initially the server interrogates (Step 10) the mobile communications device to determine its display capabilities. The mobile communications device responds (Step 12) with information indicating its display parameters such as screen size. The server then determines (Step 14) in which location on the screen is the advertisement is to be placed, based upon the contact between the advertiser and the mobile phone service provider. At this point the server downloads (Step 16) the advertisement in a form suitable for display on screen. The user then responds (Step 18) to the advertisement by transmitting a request for additional screens of information, if the user so desires. If the user does not desire additional information, the screen is either then taken out of idle mode for use by the user (Step 20) or another ad is displayed (Step 21) if the user does not use the screen in a predetermined amount of time.

Optionally, the server maintains (Step 22) a list of the pages requested by the user. The advertiser is then billed (Step 24) by the service provider according to how many requests for additional information is made by the user or how many links into the web pages are traversed by the user. Alternatively, the cost to the advertiser for display of the web page in one embodiment varies according to the web page. A "deep" web page with specific information is costs the advertiser more than a high level general web page. The assumption here is that a user that wants more information is interested in the product and hence is more valuable to the advertiser. Thus for example, if a user traversed three links to get to the web page of interest, the advertiser could in one embodiment be billed for three links or the "deep" (i.e. 3 link) web page could be billed to the advertiser at a higher rate than the top level web page.

The foregoing description has been limited to a few specific embodiments of the invention. It will be apparent, however, that variations and modifications can be made to the invention, with the attainment of some or all of the advantages of the invention. It is therefore the intent of the inventor to be limited only by the scope of the appended claims.

What is claimed is:

1. A method of advertising to a user on a mobile device viewed by the user, the method comprising:
   providing an advertisement for presentation to the user via the mobile device;
   receiving input from the user selecting the advertisement presented on the mobile device to request additional information associated with the advertisement; and
   billing the advertiser based on receiving the input from the user selecting the advertisement to request the additional information, wherein in response to receiving the input from the user selecting the advertisement, at least one web page is provided for presentation on the mobile device.

2. The method of claim 1, further comprising providing the at least one web page for display on the mobile device.

3. The method of claim 1, further comprising informing the advertiser that additional information has been requested by the user, wherein the at least one web page is provided to the mobile device by the advertiser.

4. The method of claim 1, further comprising providing at least one incentive to the user to request the additional information.

5. The method of claim 1, wherein receiving input includes receiving at least one voice request from the user selecting the advertisement to request the additional information.

6. The method of claim 5, further comprising performing voice recognition on the at least one voice request to recognize the user's selection of the advertisement.

7. The method of claim 1, wherein billing the advertiser includes billing the advertiser based, at least in part, on a location on the mobile device where the advertisement is displayed.

8. The method of claim 7, wherein a cost for displaying the advertisement at a banner location is higher than a cost associated with displaying the advertisement at a corner location.

9. The method of claim 1, wherein billing the advertiser includes billing the advertiser based, at least in part, on a number of pages provided for display on the mobile device.

10. The method of claim 6, wherein voice recognition is performed, at least in part, using embedded tags.

11. A system for displaying advertisements to a user on a mobile device viewed by the user comprising:
   at least one first server capable of communicating with the mobile device, the at least one server configured to:
   provide an advertisement for display to the user via the mobile device and receive input from the user of the mobile device selecting the advertisement to request additional information related to the advertisement; and
   bill the advertiser for the advertisement based on receiving the input from the user selecting the advertisement to request the additional information, wherein in response to receiving the input from the user selecting the advertisement, at least one web page is provided for presentation on the mobile device.

12. The system of claim 11, wherein the at least one server is configured to provide the at least one web page for presentation on the mobile device.

13. The system of claim 11, wherein the at least one server is configured to communicate with at least one advertiser server to indicate that the user has requested the additional information, and wherein the at least one web page is provided by the at least one advertiser server to the mobile device.

14. The system of claim 11, wherein the at least one server is configured to provide at least one incentive to the user to request the additional information.

15. The system of claim 11, wherein the input includes at least one voice request from the user selecting the advertisement to request the additional information, and wherein the at least one voice request is processed using voice recognition to recognize the user's selection of the advertisement.

16. The device of claim 15, wherein voice recognition is performed, at least in part, using embedded tags.

17. The system of claim 11, wherein the at least one server is configured to bill the advertiser based, at least in part, on a location on the mobile device where the advertisement is displayed.

18. The system of claim 17, wherein a cost for displaying the advertisement at a banner location is higher than a cost associated with displaying the advertisement at a corner location.

19. The system of claim 11, wherein the at least one server is configured to bill the advertiser based, at least in part, on a number of pages the user requests downloading.

* * * * *